US012598108B2

(12) United States Patent
Sun et al.

(10) Patent No.: US 12,598,108 B2
(45) Date of Patent: Apr. 7, 2026

(54) METHOD AND SYSTEM OF COLLECTING TOPOLOGY AND INVENTORY DATA IN OPEN RADIO ACCESS NETWORK

(71) Applicant: Rakuten Symphony, Inc., Tokyo (JP)

(72) Inventors: Kexuan Sun, Surrey (GB); Ravi Chamarty, Summit, NJ (US)

(73) Assignee: RAKUTEN SYMPHONY, INC., Tokyo (JP)

( * ) Notice: Subject to any disclaimer, the term of this patent is extended or adjusted under 35 U.S.C. 154(b) by 72 days.

(21) Appl. No.: 18/291,221

(22) PCT Filed: Dec. 12, 2023

(86) PCT No.: PCT/US2023/083477
§ 371 (c)(1),
(2) Date: Jan. 23, 2024

(87) PCT Pub. No.: WO2024/263206
PCT Pub. Date: Dec. 26, 2024

(65) Prior Publication Data
US 2025/0227032 A1 Jul. 10, 2025

Related U.S. Application Data

(60) Provisional application No. 63/508,905, filed on Jun. 19, 2023.

(51) Int. Cl.
*G06F 15/16* (2006.01)
*G06Q 10/087* (2023.01)
(Continued)

(52) U.S. Cl.
CPC .......... *H04L 41/12* (2013.01); *G06Q 10/087* (2013.01); *H04L 67/50* (2022.05)

(58) Field of Classification Search
CPC ........ H04L 41/12; H04L 67/50; G06Q 10/087
See application file for complete search history.

(56) References Cited

U.S. PATENT DOCUMENTS

2019/0387393 A1* 12/2019 Xu ......................... H04W 60/00
2020/0329381 A1* 10/2020 Chou .................... H04W 24/02
(Continued)

OTHER PUBLICATIONS

Polese et al. Understanding O-RAN Architecture Interfaces Algorithms 2023 (Year: 2023).*
(Continued)

*Primary Examiner* — Razu A Miah
(74) *Attorney, Agent, or Firm* — HAUPTMAN HAM, LLP

(57) ABSTRACT
A method of collecting, creating or updating topology and inventory data for a network includes receiving a request through an interface of a service management and orchestrator (SMO), wherein the request contains instructions for topology and inventory information to be collected, created or updated. The method further includes transferring the request to a topology and inventory (TE&IV) management module. The method further includes collecting, creating or updating topology and inventory data for at least a first component of the network based on the request. The topology and inventory data includes a relationship information between the first component and at least a second component of the network, and capability information for the first component.

20 Claims, 9 Drawing Sheets

(51) Int. Cl.
      *H04L 41/12*        (2022.01)
      *H04L 67/50*        (2022.01)

(56)                References Cited

U.S. PATENT DOCUMENTS

| 2020/0374793 | A1* | 11/2020 | Watfa ................... H04W 36/06 |
| 2022/0232423 | A1* | 7/2022 | Thyagaturu ........... H04W 28/10 |
| 2022/0294691 | A1* | 9/2022 | Kumar Skand Priya ................... |
| | | | G06F 8/60 |
| 2022/0353733 | A1* | 11/2022 | Vankayala ........ H04W 28/0284 |
| 2022/0366494 | A1* | 11/2022 | Cella ......................... H04L 9/50 |
| 2023/0082301 | A1* | 3/2023 | Junkins .................. H04L 43/08 |
| | | | 455/423 |

OTHER PUBLICATIONS

Michele Polese et al., "Understanding O-RAN: Architecture, Interfaces, Algorithms, Security, and Research Challenges", IEEE Communications Surveys & Tutorials, Jan. 23, 2023, pp. 1376-1411, vol. 25, No. 2, 37pp.

* cited by examiner

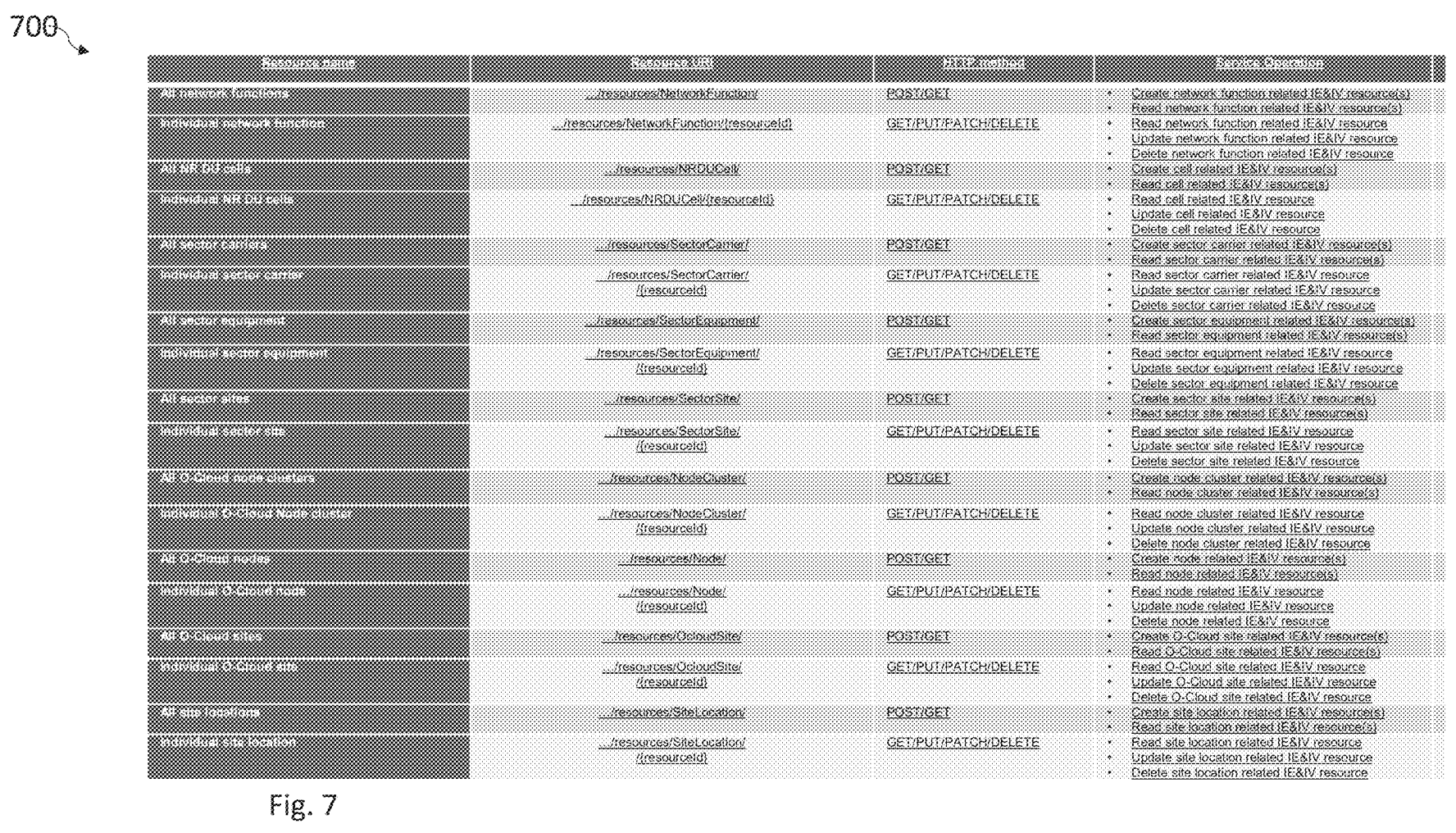

700

| Resource category | Resource URI | Method | Service Operation |
|---|---|---|---|
| | /resources/NetworkFunction/ | POST/GET | Create network function related IE&IV resource(s)<br>Read network function related IE&IV resource(s) |
| | /resources/NetworkFunction/{resourceId} | GET/PUT/PATCH/DELETE | Read network function related IE&IV resource<br>Update network function related IE&IV resource<br>Delete network function related IE&IV resource |
| | /resources/NRDUCell/ | POST/GET | Create cell related IE&IV resource(s)<br>Read cell related IE&IV resource(s) |
| | /resources/NRDUCell/{resourceId} | GET/PUT/PATCH/DELETE | Read cell related IE&IV resource<br>Update cell related IE&IV resource<br>Delete cell related IE&IV resource |
| | /resources/SectorCarrier/ | POST/GET | Create sector carrier related IE&IV resource(s)<br>Read sector carrier related IE&IV resource(s) |
| | /resources/SectorCarrier/{resourceId} | GET/PUT/PATCH/DELETE | Read sector carrier related IE&IV resource<br>Update sector carrier related IE&IV resource<br>Delete sector carrier related IE&IV resource |
| | /resources/SectorEquipment/ | POST/GET | Create sector equipment related IE&IV resource(s)<br>Read sector equipment related IE&IV resource(s) |
| | /resources/SectorEquipment/{resourceId} | GET/PUT/PATCH/DELETE | Read sector equipment related IE&IV resource<br>Update sector equipment related IE&IV resource<br>Delete sector equipment related IE&IV resource |
| | /resources/SectorSite/ | POST/GET | Create sector site related IE&IV resource(s)<br>Read sector site related IE&IV resource(s) |
| | /resources/SectorSite/{resourceId} | GET/PUT/PATCH/DELETE | Read sector site related IE&IV resource<br>Update sector site related IE&IV resource<br>Delete sector site related IE&IV resource |
| | /resources/NodeCluster/ | POST/GET | Create node cluster related IE&IV resource(s)<br>Read node cluster related IE&IV resource(s) |
| | /resources/NodeCluster/{resourceId} | GET/PUT/PATCH/DELETE | Read node cluster related IE&IV resource<br>Update node cluster related IE&IV resource<br>Delete node cluster related IE&IV resource |
| | /resources/Node/ | POST/GET | Create node related IE&IV resource(s)<br>Read node related IE&IV resource(s) |
| | /resources/Node/{resourceId} | GET/PUT/PATCH/DELETE | Read node related IE&IV resource<br>Update node related IE&IV resource<br>Delete node related IE&IV resource |
| | /resources/OcloudSite/ | POST/GET | Create O-Cloud site related IE&IV resource(s)<br>Read O-Cloud site related IE&IV resource(s) |
| | /resources/OcloudSite/{resourceId} | GET/PUT/PATCH/DELETE | Read O-Cloud site related IE&IV resource<br>Update O-Cloud site related IE&IV resource<br>Delete O-Cloud site related IE&IV resource |
| | /resources/SiteLocation/ | POST/GET | Create site location related IE&IV resource(s)<br>Read site location related IE&IV resource(s) |
| | /resources/SiteLocation/{resourceId} | GET/PUT/PATCH/DELETE | Read site location related IE&IV resource<br>Update site location related IE&IV resource<br>Delete site location related IE&IV resource |

Fig. 7

METHOD AND SYSTEM OF COLLECTING TOPOLOGY AND INVENTORY DATA IN OPEN RADIO ACCESS NETWORK

PRIORITY CLAIM AND CROSS-REFERENCE

This application is a National Phase of International Application No. PCT/US2023/083477, filed Dec. 12, 2023, which claims priority to Provisional Application No. 63/508, 905, filed Jun. 19, 2023, the entire contents of which are herein incorporated by reference.

BACKGROUND

Open radio access network (O-RAN) uses service management and orchestrator (SMO) and non-real time RAN intelligent controller (NON-RT RIC) to help with managing devices within an O-RAN architecture. The SMO and NON-RT RIC are usable with O-RAN Alliance standards to provide operators with services for tracking inventory and topology of devices within the O-RAN architecture. The inventory services include identifying and maintaining information related to devices within the O-RAN architecture. The topology services include tracking links between devices in order to provide service to customers of an O-RAN system. In some instances, application programming interfaces (APIs) only provide configuration management and are not capable of topology and inventory management within an O-RAN architecture. Further, some approaches are limited to being able to access data in only a cloud network or only in a radio network.

SUMMARY

An aspect of this description relates to a method of collecting, creating or updating topology and inventory data for a network. The method includes receiving a request through an interface of a service management and orchestrator (SMO), wherein the request contains instructions for topology and inventory information to be collected, created or updated. The method further includes transferring the request to a topology and inventory (TE&IV) management module. The method further includes collecting, creating or updating topology and inventory data for at least a first component of the network based on the request. The topology and inventory data includes a relationship information between the first component and at least a second component of the network, and capability information for the first component.

An aspect of this description relates to a non-transitory computer readable medium configured to store instructions thereon for causing a system to execute a method. The method includes receiving a request through an interface of a service management and orchestrator (SMO), wherein the request contains instructions for topology and inventory information to be collected, created or updated. The method further includes transferring the request to a topology and inventory (TE&IV) management module. The method further includes collecting, creating or updating topology and inventory data for at least a first component of the network based on the request. The topology and inventory data includes a relationship information between the first component and at least a second component of the network, and capability information for the first component.

An aspect of this description relates to a system for collecting, creating, or updating topology and inventory data for a network. The system includes a service management and orchestrator (SMO). The SMO is configured to receive a request through an interface, wherein the request contains a topology and inventory information to be collected, created or updated. The SMO is further configured to transfer the request to a topology and inventory (TE&IV) management module. The SMO is further configured to collect, create or update topology and inventory data for at least a first component of the network based on the query. The topology and inventory data includes a relationship information between the first component and at least a second component of the network, and capability information for the first components. The SMO is further configured to output the collected topology and inventory data through the interface.

An aspect of this description relates to a method of creating and updating topology and inventory data for a network. The method includes receiving a request through an interface of a service management and orchestrator (SMO), wherein the request contains a topology and inventory information to be created or updated. The method further includes transferring the request to a topology and inventory (TE&IV) management module. The method further includes creating or updating topology and inventory data for at least a first component of the network based on the request. The topology and inventory data includes relationship information for indicating a relationship between the first component and at least a second component of the network, and capability information for the first component.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7 is a table of sample queries for retrieving topology and inventory data for an O-RAN in accordance with some embodiments.

DETAILED DESCRIPTION

Figure 1:
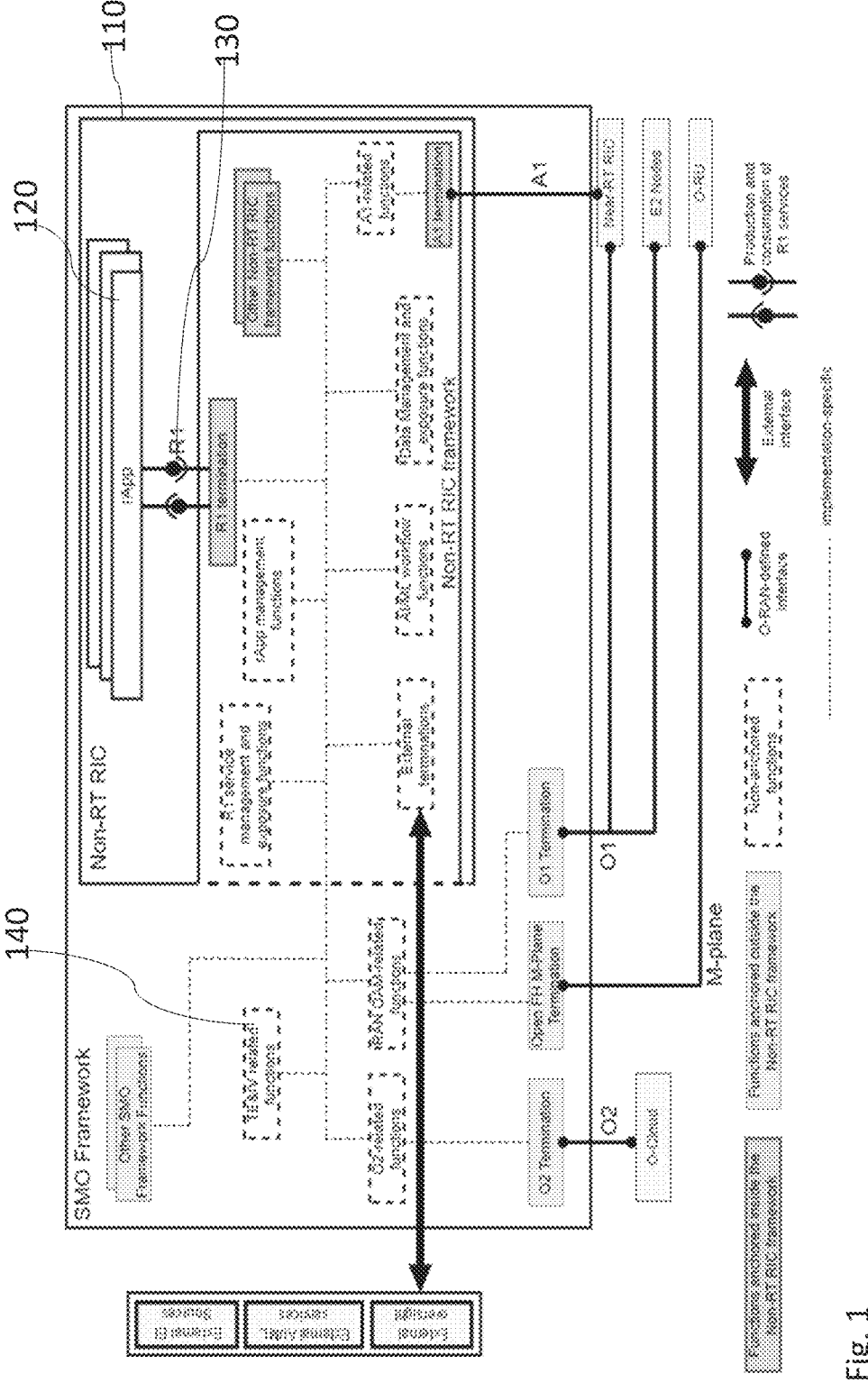
FIG. 1 is a block diagram of a service management and orchestrator (SMO) in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The current description includes information related to an API to help improve management of topology and inventory within an O-RAN architecture. New radio (NR) network resource models (NRMs) have been studied in 3GPP; however, these NRMs only apply to RAN configuration management. Other approaches to topology and inventory management models for general telecommunication sites and equipment does not fit the disaggregated and cloud-native network deployment based on O-RAN. Other API frameworks for general cloud resource inventory management do not fit mobile network specific applications and there are no detailed API service operations, procedures, information or data models.

The present description includes a service API solution to assist with unaddressed concerns in O-RAN and 3GPP for inventory and topology management and information exposure in the SMO. The description includes a comprehensive API design including service operations, procedures, as well as information and data models for inventory and topology management and information exposure of both RAN functions and O-Cloud resources in the O-RAN cloud-native network environment. The service operations, procedure, and information and data models are designed to be generic to permit the data models to be applied to numerous different interfaces within the SMO for interoperability, such as the R1 interface, topology and inventory management services as well as the SMO external interfaces to external functions, services, applications and tools.

The current description enables multi-vendor interoperability between the topology and inventory management function in the SMO and other functions and applications within and outside the SMO. The API also helps to enable inventory and topology information exposure to non-real time network automation in the SMO/Non-RT RIC via the R1 interface. With the topology and inventory management service API interface provided in this description, an integrated end to end multi-vendor environment/toolset is able to be provided to the operators to enable automated workflow from network planning, network function provisioning and deployment, O-Cloud resource orchestration and management, to operation phase network performance optimization. This API greatly reduces the operation cost, time, complexity and risk in the network O&M process in comparison with other approaches.

Using the API of the current description permits both third party applications, such as rApps, and network operators to query a network that includes both cloud computer and radio network components in order to determine a topology and inventory of the entire network. This provides increased functionality and utility for the API in comparison with other approaches, which are limited based on specific language or syntax requirements for certain networks or network types, to be able to effectively utilize functionality of components of the entire network from a single interface with a same query.

The current description also includes an ability to tailor access based on an identity of an initiator of a query, such as a network operator or an owner of an rApp. In some embodiments, the access is tailored to limit a depth of a query. In some embodiments, the access is tailored to limit a frequency of queries from a same initiator. In some embodiments, the access is tailored to restrict access to one or more components within the network. In some embodiments, the access is tailored based on a fee received from the initiator.

FIG. 1 is a block diagram of a service management and orchestrator (SMO) 100 in accordance with some embodiments.

Details of the SMO 100 are not discussed in detail for the sake of brevity. The SMO 100 includes a non-real time RAN intelligent controller (non-RT RIC) 110. The non-RT RIC 110 facilitates control of components within an O-RAN network and the resources of the components. The SMO 100 further includes a plurality of rApps 120. An rApp 120 is a software application that is executed utilizing resources of the O-RAN network. The rApps 120 communicate with other modules of the SMO 100 through an R1 interface 130. The R1 interface 130 provides the rApps 120 with access to the O-RAN for queries or triggering operations via the SMO 100. The SMO 100 further includes a topology and inventory (TE&IV) management module 140. The TE&IV management module 140 includes information related to a topology of the O-RAN as well as inventory of components within the O-RAN. The topology includes information related to location of a component; control of a component by another component; control by the component of another component; connections between components; and/or other interrelationship between components of the O-RAN. The inventory includes information related to functionality of the components within the O-RAN. One of ordinary skill in the art would recognize that the SMO 100 includes additional modules and functionality. For the sake of brevity, those modules and functionalities are not discussed here in detail.

In some embodiments, one or more of the rApps 120 are generated by third parties that do not control the O-RAN. In some embodiments, one or more of the rApps 120 are generated by a vendor or operator of the O-RAN. The rApps 120 are installed in the non-RT RIC 110 for execution using the components of the O-RAN. During operation, the rApps 120 will submit queries to the TE&IV management module 140 through the R1 interface 130 in order to obtain information related to topology and inventory of the O-RAN in order for the rApps 120 to execute its functions. The queries help to ensure that the rApps 120 are able to operate properly utilizing the components of the O-RAN. In response to the queries, the TE&IV management module 140 provides data to the rApps 120 through the R1 interface 130. The data includes information about the O-RAN, which enables the rApps 120 to generate a map of the O-RAN to allow the rApps 120 to submit instructions to one or more components of the O-RAN to execute the functions of the rApps 120.

In some embodiments, a network operator also submits queries to the TE&IV management module 140. In some embodiments, the network operator submits queries to help determine a health of the O-RAN. In some embodiments, the network operator submits queries to determine a capability of the O-RAN. In some embodiments, the network operator submits queries to alter a topology of the O-RAN, e.g., by altering connection relationships between components; adding components; removing components; or other suitable actions. In some embodiments, certain operations that alter a topology of the O-RAN are able to be implemented only by network operators. That is, the rApps 120 are prohibited from altering the O-RAN.

A syntax of the queries is generic to provide increased utility across a wide range of networks owned and operated by different entities. By providing generic syntax, developers of the rApps 120 are able to reduce time and expense by avoiding customization operations for various network specific requirements.

The TE&IV management module 140 includes services operations, procedures, and information and data models, such as Create, Read, Update and Delete (CRUD) operations. In some embodiments, the TE&IV management module 140 includes services, operations, procedures and information and data models for at least the following use cases:

cells information: This service operation allows to CRUD aggregated information related to O-RAN cells.

network function information: This service operation allows to CRUD aggregated information related to network functions, e.g., O-CU-CP, O-CU-UP and O-DU.

sector carrier information: This service operation allows to CRUD aggregated information related to sector carriers.

sector equipment information: This service operation allows to CRUD aggregated information related to sector equipment, e.g., O-RU.

sector site information: This service operation allows to CRUD aggregated information related to sector sites.

O-Cloud infrastructure Inventory information: This service operation allows to CRUD aggregated information related to O-Cloud infrastructures, e.g., O-Cloud site, O-Cloud node and node clusters, servers, hardware accelerators and storages etc.

O-Cloud deployment Inventory information: This service operation allows to CRUD aggregated information related to O-Cloud NF deployment.

site location information: This service operation allows to CRUD aggregated information related to sector and O-Cloud sites.

topology information: This service operation allows to CRUD aggregated information related to topology of the network.

The TE&IV management module 140 is able to implement the CRUD operations to obtain data usable by the rApps and other SMO internal and external functions 120. Information model and class hierarchy of topology and inventory CRUD operations are discussed below with respect to FIGS. 4 and 5, which are capable of being implemented using SMO 100 in some embodiments.

Figure 4:
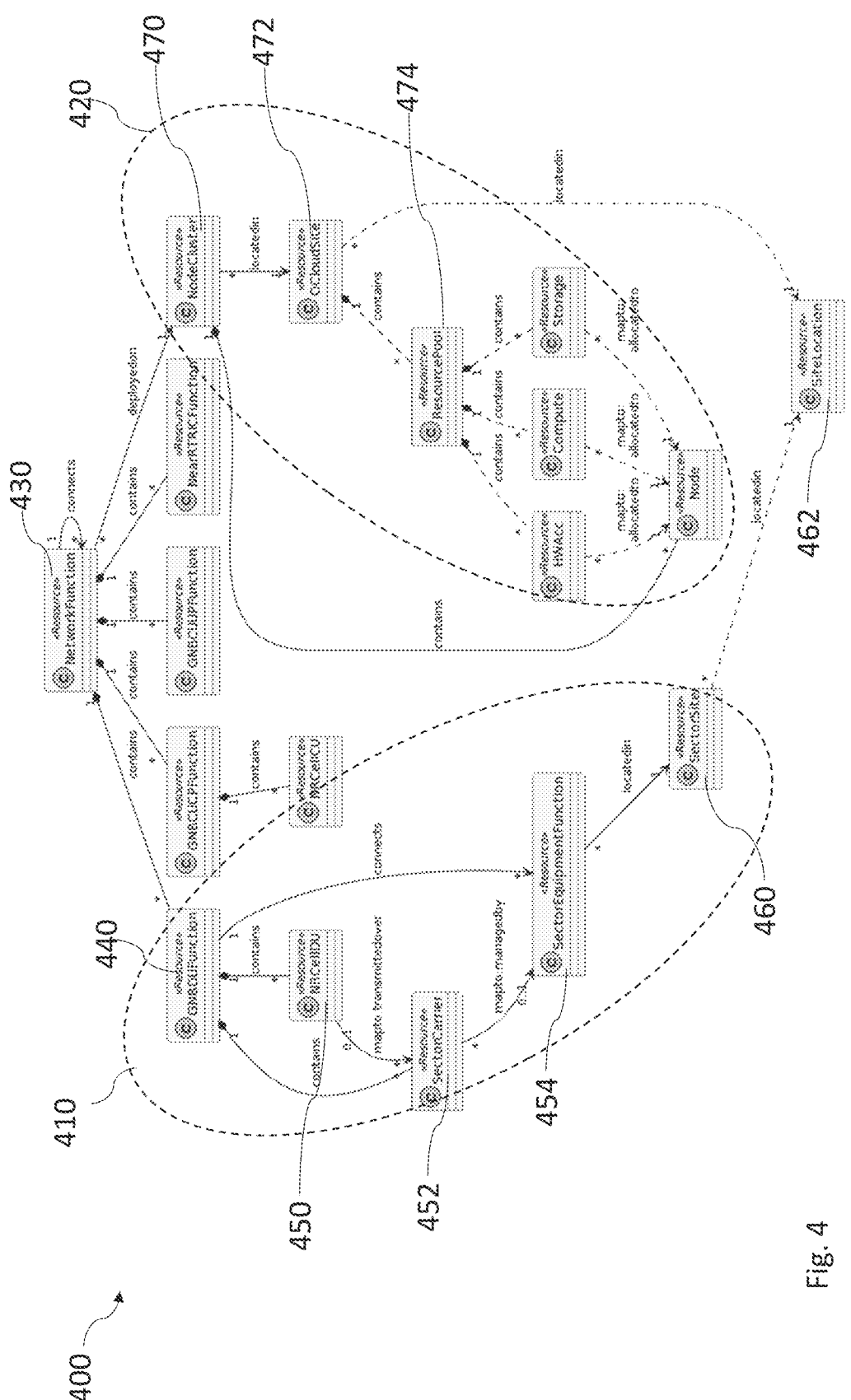
FIG. 4 is a schematic diagram of topology and inventory arrangements of components in an O-RAN in accordance with some embodiments.
Figure 5:
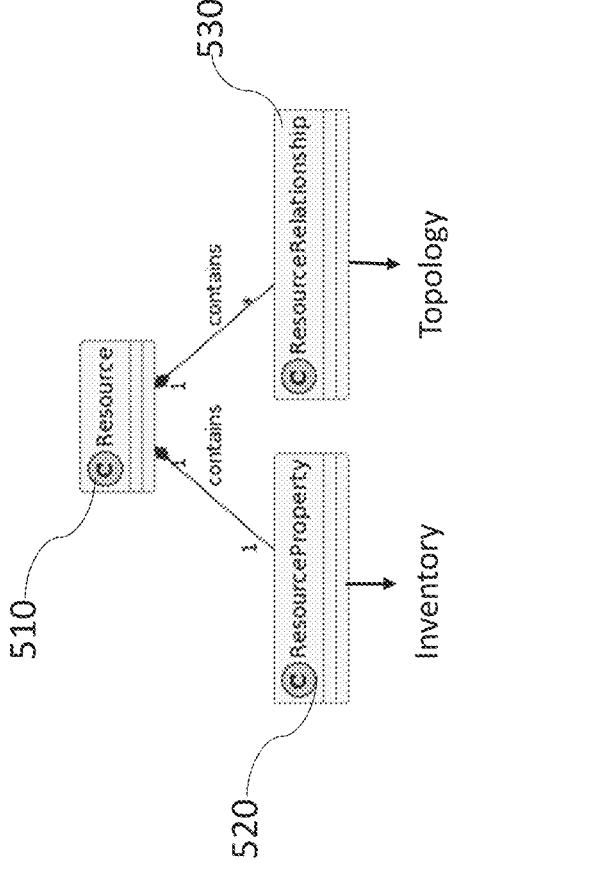
FIG. 5 is a schematic diagram of topology and inventory arrangements in an O-RAN in accordance with some embodiments.

The following clauses provide more detailed descriptions of the information model and class hierarchies provided FIG. 4 and FIG. 5:

A NetworkFunction contains 0 to many GNBDUFunction (s), GNBCUCPFunction(s), GNBCUUPFunction(s) or NearRTRICFunctions(s) representing the inventory information of the O-DUs, O-CU-CPs, O-CU-UPs and Near-RT RICs.

The model fragments are usable for management representation of gNB and en-gNB for at least NG-RAN deployment scenarios as listed below same as the NR NRM model defined in 3GPP TS 28.541:

Non-split NG-RAN deployment scenario, represents the gNB defined in TS 38.401. In this scenario, a gNB is represented by a combination of a GNBCUCPFunction, one or more GNBCUUPFunctions and one or more GNBDUFunctions.

2-split NG-RAN deployment scenario, represents the gNB and includes gNB-CU and gNB-DU defined in TS 38.401 clause 6.1.1. In this scenario, a gNB-CU is represented by a combination of a GNBCUCPFunction and one or more GNBCUUPFunctions, whereas a gNB-DU is represented by a GNBDUFunction.

3-split NG-RAN deployment scenario, represents the gNB and includes gNB-CU-CP, gNB-CU-UP and gNB-DU defined in TS 38.401 clause 6.1.2. In this scenario, a gNB-CU-CP is represented by a GNB-CUCPFunction, a gNB-CU-UP is represented by a GNBCUUPFunction, and a gNB-DU is represented by a GNBDUFunction.

A GNBDUFunction contains:

0 to many NRCellDU(s) representing the inventory information for NR Cells.

0 to many SectorCarrier(s) representing the inventory information for sector carriers.

A GNBDUFunction connects to 0 to many SectorEquipmentFunction(s) representing inventory information for O-RUs, and the Open Fronthaul (O-FH) connection between the O-DU and O-RUs.

Similar to the NR NRM model defined in 3GPP TS 28.541, 0 to 1 NRCellDU maps to, i.e., transmits to, 0 to many SectorCarrier(s) which map to, i.e., are managed by, 0 to 1 SectorEquipmentFunction.

0 to many SectorEquipmentFunction(s) are located in a SectorSite representing inventory information for a sector, cell, or antenna site.

A GNBCUFunction contains 0 to many NRCellCU(s) representing part of the NR Cell inventory information related to mobility and neighbor cell relations.

A NetworkFunction connected to 0 to many other NetworkFunction(s) representing connections among RAN functions via interfaces, e.g., F1, X2, Xn, E1 or E2 interfaces.

A NodeCluster, representing inventory information of O-Cloud Node Clusters, contains 0 to many Node(s) representing inventory information of O-Cloud nodes.

A OCloudSite contains 0 to many ResourcePool(s) representing O-Cloud resource pools.

A ResourcePool contains 0 to many HWAcc(s), Compute (s), and Storage(s) resenting O-Cloud resources-hardware accelerators, Compute servers and storages.

HWAcc(s), Compute(s), and Storage(s) from single or multiple resource pools are "allocated to" the Node(s) in the NodeCluster(s) located in the OCloudSite.

NetworkFunction(s) is/are deployed on the NodeCluster.

SectorSite(s) and OCloudSite(s) are "locatedin" the Site-Location(s) representing the site location information.

Inventory Information of each RAN element in FIG. 4 is encapsulated in the ResourceProperty inherited from the base class-Resource.

Topology Information described relationships among the O-RAN elements, e.g., those included in FIG. 4, such as contains, mapto, locatedin and deployedon, is encapsulated in the ResourceRelationship inherited from the base class-Resource.

The relationship "mapto" captures multiple relationships, e.g., managedby, allocatedto and transmittedover, etc.

Table 700 in FIG. 7 includes a non-limiting list of service operations and HTTP methods supported by each modelled TE&IV Resource Class (in FIG. 4) identified by its Resource URI—/resource/{resourceName}/{resourceId}, where resourceName is the same as the resource class name shown in FIG. 4, resourceID is an identity to identify a particular resource object instance that realizes a resource class. URI structures, parameters and message bodies supported by each HTTP method, GET, PUT, POST, PATCH, DELETE supporting the listed service operations are described in detail. One of ordinary skill in the art would understand that different HTTP methods are within the scope of this description.

RETRIEVE Resource (GET)

Syntax

GET/resource/{resourceName}/{resourceId}?fields= . . . & {depth} & {expand} & {relationships} where resourceName: specifies the name of the component such as NetworkFunction, NRDUCell, SectorEquipment etc.

resourceId: specifies the an identifying number of the component.

fields: specifies which properties of the component to include in the retrieved information. In some embodiments, all properties of a component are returned by default. In some embodiments, if one or more field is specified, then only the listed fields are returned.

depth: specifies the number of hops to permit searching from an initial resource of the O-RAN to other components of the O-RAN. Increasing the depth beyond a value of 0 permits a query to include additional related components. A depth value of zero indicates that only information related to the initial resource is retrieved. A depth value of one includes components that are directly connected to the initial resource. Higher depth values permit the query to capture information from components having more remote connections to the initial resource of the O-RAN. Additional details of the depth parameter are discussed below with respect to FIG. 6.

expand: specifies which relationships to expand when including a component of the O-RAN. The expand parameter specifies whether to include details of retrieved related components. In some embodiments, a related component is included by default. In some embodiments, only the retrieved component is included by default.

relationships: specifies the relationship types between components. The relationships parameter specifies which relationships to retrieve with a component. In some embodiments, all out relationships are retrieved by default. In some embodiments, the relationships parameter is modified to include incoming relationships and outgoing relationships. In some embodiments, the relationships parameter is usable to filter the included relationship by a type of the related component.

In some embodiments, a format of a relationship modification includes:

$$relationships = \langle relationshiptype \rangle \langle direction \rangle$$

To include all incoming relationships, the following form is usable:

$$relationships = *.in$$

To include both incoming and outgoing relationship, the following form is usable:

$$relationships = *.both$$

To target specific relationships, the following form is usable:

$$relationships = containedin.\text{in}, locatedin.\text{out}$$

Command Example 2: CREATE Resource (POST)

Syntax

POST/resource/{resourceName} (ResourceObject)

where ResourceObject: is contained in a message body and represents the component to be added to the topology and inventory of the O-RAN.

Command Example 3: UPDATE Resource (PUT)

Syntax

PUT/resource/{resourceName}}/{resourceId} (ResourceObject)

where ResourceObject: is contained in a message body and represents the component to be updated.

Command Example 4: PATCH Resource (PATCH)

Syntax

PATCH/resource/{resourceName}/{resourceId} (ResourceObject)

where ResourceObject: is contained in a message body and represents the component to be patched.

Command Example 5: DELETE Resource (DELETE)

Syntax

DELETE/resource/{resourceName}/{resourceId} where the resource name: is contained in a message body and represents the component to be removed from the topology and inventory of the O-RAN.

While the above description specifically mentions rApps 120 and the R1 interface 130, these are merely used as examples for explanation of the current description. One of ordinary skill in the art would understand that the current description is not limited solely to rApps 120 and utilization of the R1 interface 130. Further, the above commands are merely exemplary to assist with understanding of functionality of the current description. One of ordinary skill in the art would recognize that additional commands are within the scope of this description, such as the additional commands mentioned in Table 700 (FIG. 7).

Figure 2:
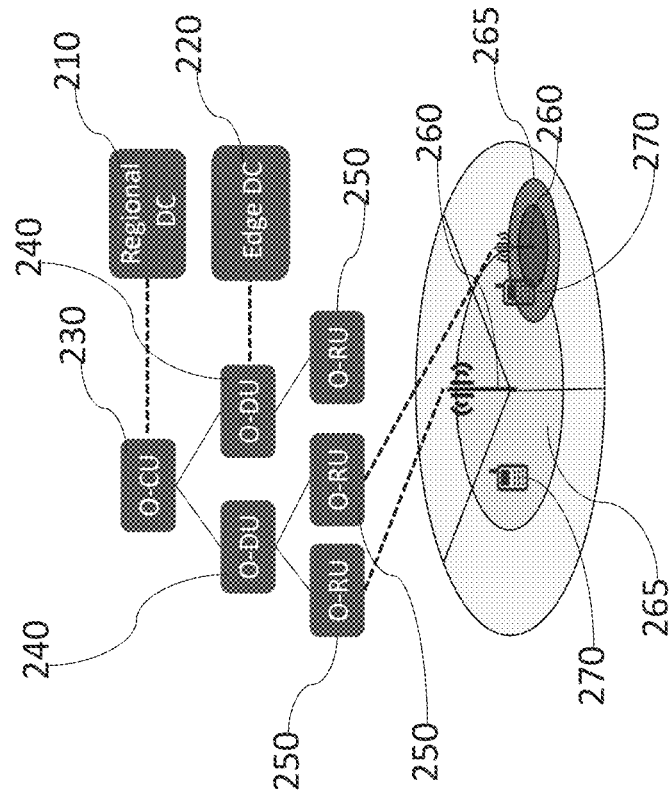
FIG. 2 is a schematic diagram of radio network components in accordance with some embodiments.

FIG. 2 is a schematic diagram of radio network components 200 in accordance with some embodiments. The radio network components 200 include a regional data center (DC) 210 and an edge DC 220. The regional DC 210 communicates with and controls the operation of an open central unit (O-CU) 230. The edge DC 220 communicates with and controls the operation of open distributed unites (O-DU) 240. The O-CU 230 also controls some operation of the O-DU 240. The O-DU 240 in turn controls the operation of the open radio unit (O-RU) 250. The radio network components 200 include multiple O-DU 240 and multiple O-RU 250. The O-RU 250 is located in based stations at site locations 260. Each site location 260 has a corresponding coverage area 265. User equipment (UE) 270 within a coverage area 265 are able to connect to the O-RU 250 at the site location 260. Through the O-RU 250, the UE 270 is able to exchange information with other components of the radio network components 200.

In some embodiments, the SMO 100 (FIG. 1) includes rApps 120 that seek to gather information from components of a radio network, such as the radio network components 200. In some embodiments, in response to a query from the rApps 120, the TE&IV management module 140 captures information from the radio network components 200, such as geographic position of the site locations 260, a number of UE 270 connected to the O-RU 250 within a specified time interval, processing capacity of at least one of the regional DC 210 or the edge DC 220, or other suitable information. Utilizing the SMO 100 in combination with the radio network components 200 helps the developers of the rApps 120 to gather additional information for enhancing the rApps 120 and providing better experience to users, such as the operators of the UE 270. Further, by utilizing generic syntax for queries, the SMO 100 allows the developers of the rApps 120 to program the rApps 120 agnostic to the owner of the radio network components 200.

Figure 3:
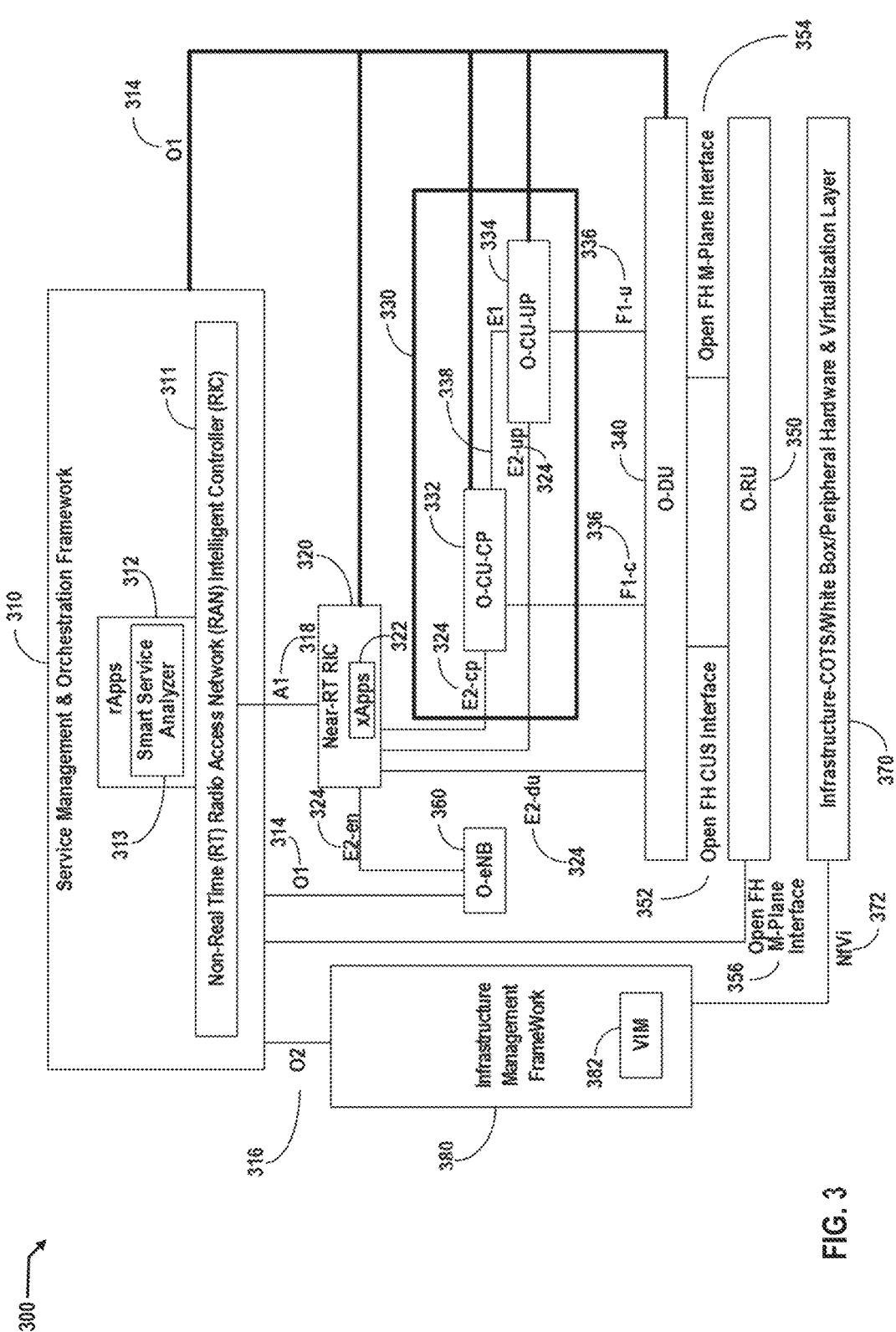
FIG. 3 is a block diagram of an Open Radio Access Network (O-RAN) in accordance with some embodiments.

FIG. 3 is a block diagram of an Open Radio Access Network (O-RAN) 300 in accordance with some embodiments.

In FIG. 3, Service Management and Orchestration (SMO) Framework 310 is an automation platform for Open RAN Radio Resources. SMO 310 oversees lifecycle management of network functions as well as O-Cloud. SMO 310 includes a Non-Real-Time (RT) Radio Access Network (RAN) Intelligent Controller (RIC) 311. SMO 310 further defines various SMO interfaces, such as the O1 315, O2 316, and A1 318 interfaces. In some embodiments, SMO 310 is similar to the SMO 100 (FIG. 1).

The A1 interface 318 enables communication between the non-RT RIC 311 and a Near-RT RIC 320 and supports policy management, data transfer, and ML management. The A1 interface 318 is further used for policy guidance. SMO 310 provides fine-grained policy guidance such as getting User-Equipment to change frequency, and other data enrichments to RAN functions over the A1 interface 318.

The O1 315 interface connects the SMO 310 to the RAN managed elements, which include the Near-RT RIC 320, O-RAN Centralized Unit (O-CU) 330, O-RAN Distributed Unit (O-DU) 340, and the Open Evolved NodeB (O-eNB) 360. The management and orchestration functions are received by the managed elements via the O1 interface 315. The SMO 310 in turn receives data from the managed elements via the O1 interface 315 for AI model training at the non-RT RIC 311. The O1 interface 315 is further used for managing the operation and maintenance (OAM) of multi-vendor Open RAN functions including fault, configuration, accounting, performance and security management, software management, and file management capabilities.

The O2 interface 316 is usable to support cloud infrastructure management and deployment operations with O-Cloud infrastructure that hosts the Open RAN functions in the network. The O2 interface 316 supports orchestration of O-Cloud infrastructure resource management (e.g., inventory, monitoring, provisioning, software management and lifecycle management) and deployment of the Open RAN network functions, providing logical services for managing the lifecycle of deployments that use cloud resources.

SMO 310 provides a common data collection platform for management of RAN data as well as mediation for the O1 315, O2 316, and A1 318 interfaces. Licensing, access control and AI/ML lifecycle management are supported by the SMO 310, together with legacy north-bound interfaces. SMO 310 further supports existing OSS functions, such as service orchestration, inventory, topology, and policy control.

The non-RT RIC 311 enables non-real-time (>1 second) control of RAN elements and their resources through cloud-native microservice-based applications, which are referred to as rApps 312. An rApp 312 implements a Smart Service Analyzer 313 that includes a Key Performance Indicator (KPI) Normalizer 314. Non-RT RIC 311 communicates with applications called xApps 322 running on a Near-RT RIC 311 to provide policy-based guidance for edge control of RAN elements and their resources. The non-RT RIC 311 provides non-real-time control and optimization of RAN elements and resources, AI/ML workflow, including model training of the KPI Normalizer 314 of Smart Service Analyzer 313, updates, and policy-based guidance of applications/features in Near-RT RIC 320.

Near-RT RIC 320 controls RAN infrastructure at the cloud edge. Near-RT RIC 320 controls RAN elements and their resources with optimization actions that typically take 10 milliseconds to one second to complete. The Near-RT RIC 320 receives policy guidance from the non-RT RIC 311 and provides policy feedback to the non-RT RIC 311 through xApps 322.

The xApps 322 are used to enhance the RAN's spectrum efficiency. The Near-RT RIC 320 manages a distributed collection of "southbound" RAN functions, and further provides "northbound" interfaces for operators: the O1 315 and A1 318 interfaces to the non-RT RIC 311 for the management and optimization of the RAN. The Near-RT RIC 320 is thus able to self-optimize across different RAN types, like macros, Massive MIMO, and small cells, maximizing network resource utilization for 5G network scaling.

Within the Near-RT RIC 320, the xApps 322 communicate via defined interface channels. An internal messaging infrastructure provides the framework to handle conflict mitigation, subscription management, app lifecycle management functions, and security. Data transfers are implemented via the E2 interfaces 324.

The O-RAN is split into a Central Unit (CU) 330, a Distributed Unit (DU) 340, and a Radio Unit (RU) 350. The CU 330 is further split into two logical components, one for the Control Plane (CP) 332, and one for the User Plane (UP) 334. The logical split of the CU 330 into the CP 332 and UP 334 allows different functionalities to be deployed at different locations of the network, as well as on different hardware platforms. For example, CUs 330 and DUs 340 can be virtualized on white box servers at the edge, while the RUs 350 are implemented on Field Programmable Gate Arrays (FPGAs) and Application-specific Integrated Circuits (ASICs) boards and deployed close to RF antennas.

The O-RAN Distributed Unit (O-DU) 340 is an edge server that includes baseband processing and radio frequency (RF) functions. The O-DU 340 hosts radio link control (RLC), MAC, and a physical layer with network function virtualization or containers. O-DU 340 supports one or more cells, and the O-DUs 340 supports one or more beams to provide the operating support for O-RU 350 by CUS (Control, User, and Synchronization) planes 352, and management (M) planes 354 through front-haul interfaces.

The O-RU 350 processes radio frequencies received by the physical layer of the network. The processed radio frequencies are sent to the O-DU 340 through fronthaul interfaces 352, 354. The O-RU 350 hosts the lower PHY Layer Baseband Processing and RF Front End (RF FE) and is designed to support multiple 3GPP split options.

An Open-Evolved Node B (O-eNB) 360 provides the hardware aspect of the O-RAN. The management and orchestration functions are received by the managed elements via the O1 interface 315. The SMO 310 in turn receives data from the managed elements via the O1 interface 315 for the KPI Normalizer 314 of Smart Service Analyzer 313 implemented by rApps 312 at non-RT RIC 311. The O-eNB 360 communicates with the Near-RT RIC 320 via the E2 interface 324. E2 324 enables near-real-time loops through the streaming of telemetry from the RAN and the feedback with control from the Near-RT RIC 320. The E2 interface 324 connects the Near-RT RIC 320 with an E2 node, such as the O-CU-CP 332, O-CU-UP 334, the O-DU 340, and the O-eNB 360. An E2 node is connected to one Near-RT RIC 320, while a Near-RT RIC 320 is connected to multiple E2 nodes. The protocols over the E2 interface 324 are based on the control plane and supports services and functions of Near-RT RIC 320.

An F1 Interface 336 connects the O-CU-CP 332 and the O-CU-UP 334 to the O-DU 340. Thus, the F1 interface 336 is broken into control and user plane subtypes and exchanges data about the frequency resource sharing and other network statuses. One O-CU 330 can communicate with multiple O-DUs 340 via F1 interfaces 336.

An E1 338 interface connects the O-CU-CP 332 and the O-CU-UP 334. The E1 Interface 338 is usable to transfer configuration data and capacity information between the O-CU-CP 332 and the O-CU-UP 334. The configuration data ensures the O-CU-CP 332 and the O-CU-UP 334 are able to interoperate. The capacity information is sent from the O-CU-UP 334 to the O-CU-CP 332 and includes the status of the O-CU-UP 334.

The O-DU 340 communicates with the O-RU 350 via an Open Fronthaul (FH) Control, User, and Synchronization (CUS) Plane Interface 352 and an Open Fronthaul (FH) M-Plane (Management Plane) Interface 354. As part of the CUS Plane Interface 352, the C-Plane (control plane) is a frame format that carries data in real-time control messages between the O-DU 340 and O-RU 350 for use to control user data scheduling, beamforming weight selection, numerology selection, etc. Control messages are sent separately for downlink (DL)-related commands and uplink (UL)-related commands.

The U-Plane of the CUS Plane Interface 352 carries the user data messages between the O-DU 340 and O-RU 350, such as the in-phase and quadrature-phase (IQ) sample sequence of the orthogonal frequency division multiplexing (OFDM) signal. The S-plane of the CUS Plane Interface 352 includes synchronization messages used for timing synchronization between O-DU 340 and O-RU 350. The Control and User Plane of the CUS Plane Interface 352 is further used to send information specifying beamforming weights from the O-DU 340 to O-RU 350. Other information includes time resource and frequency resource information.

The Open FH M-Plane 354 connects the O-RU 350 to the O-DU 340, and an optional Open FH M-Plane 356 connects the O-RU 350 to the SMO 310. The O-DU 340 uses the Open FH M-Plane 354 to manage the O-RU 350, while the SMO 310 provides FCAPS (Fault, Configuration, Accounting, Performance, Security) services to the O-RU 350. The Open FH M-plane 354 supports the management features including startup installation, software management, configuration management, performance management, fault management and file management.

The Open FH M-Plane 354 is usable by the O-DU 340 to retrieve the capabilities of the O-RU 350 and to send relevant configuration related to the C-Plane and U-Plane (data plane) of the Open FH CUS Interface 352 to the O-RU 350. Together the O1 315 and Open FH M-plane 354 interfaces provide a FCAPS interface with configuration, reconfiguration, registration, security, performance, monitoring aspects exchange with individual nodes, such as O-CU-CP 332, O-CU-UP 334, O-DU 340, and O-RU 350, as well as non-RT RIC 320.

Infrastructure-COTS/White Box/Peripheral Hardware & Virtualization Layer 370 connects to Infrastructure Management Framework 380 via Network Function Virtualization Interface (NFVI) 372. Virtualized Infrastructure Manager (VIM) 382 at Infrastructure Management Framework 380 controls and manages virtual network functions.

FIG. 4 is a schematic diagram 400 of topology and inventory information model modelling the arrangements of components in an O-RAN in accordance with some embodiments. The diagram includes numerous components of the O-RAN. Not all components are labeled or discussed in detail for the sake of brevity. The components included in diagram 400 are merely exemplary to assist with understanding the current description. One of ordinary skill in the art would understand that different components are within the scope of this disclosure.

The diagram includes a plurality of radio network components 410 and a plurality of cloud computer components 420. The diagram 400 includes relationship information between the various components, such as contains, deployedon, managedby, connects, etc. These relationships define the topology of the components in the diagram 400. Further, geographical relationships, such as locatedin, provide information for a physical location of a component, similar to the site location 260 (FIG. 2). In response to a query from an rApp, such as rApps 120 (FIG. 1), a TE&IV management module, such as TE&IV management module 140 (FIG. 1), is able to provide information related to the relationships between components of the O-RAN as well as capabilities, or inventory, of the components of the O-RAN. In some embodiments, the topology and inventory information is stored in a database accessible by the TE&IV management module.

The following examples of responses to queries are merely to assist in understanding the current description and do not limit the scope of the current disclosure. In at least one example where a TE&IV management module receives a query from an rApp regarding topology and inventory of the radio network components 410, the TE&IV management module would return information indicating the following relationships. The GNBDUFunction 440 is contained in the NetworkFunction 430 at a depth of 1 from the Network-Function 430. The NRCellDU 450 is contained in the GNBDUFunction 440 at a depth of 2 from the Network-Function 430. The NRCellDU 450 is mapped to and transmits over the SectorCarrier 452 and the SectorCarrier 452 is contained in the GNBDUFunction 440. The SectorCarrier 452 is mapped to and managed by the SectorEquimentFunction 454, and the SectorEquipmentFunction 454 connects to the GNBDUFunction 440. The SectorEquipmentFunction 454 is located in the SectorSite 460, which is located in the SiteLocation 462. The above topology information permits the rApp to collect data for both how to execute a functionality of the rApp and at what geographic location(s) the functionality would be executed utilizing the radio network components 410.

Similarly, in at least one example where a TE&IV management module receives a query from an rApp regarding topology and inventory of the cloud computing components 420, the TE&IV management module would return information indicating the following relationships. The Network-Function 440 is deployed on the NodeCluster 470, which is a depth of 1 from the NetworkFunction 440. The NodeCluster 470 is located in an OCloudSite 472, which is a depth of 2 from the NetworkFunction 440. The ResourcePool 474 is contained in the OCloudSite 472; and the OCloudSite 472 is located in the SiteLocation 462. The above topology information permits the rApp to collect data for both how to execute a functionality of the rApp and at what geographic location(s) the functionality would be executed utilizing the cloud computing components 420.

As seen in the diagram 400, a geographic location of at least one of the radio network components 410 and the cloud computing components 420 is a same location, i.e., site location 462. By utilizing the query functionality of the current application, e.g., described above with respect to SMO 100 (FIG. 1), developers of rApps are able to collect information about an entirety of the O-RAN in the diagram 400 utilizing a common query. In comparison, other approaches would force the developers of the rApps to account for different queries to collect information related to the radio network components 410 and the cloud computing components 420. Thus, the query functionality of the current description provides enhanced efficiency and reduced complexity for rApp developers seeking to utilize the O-RAN.

The above description relates to obtaining topology information related to the O-RAN. However, the query functionality is also capable of determining inventory or capabilities of components of the O-RAN. A description of obtaining both topology and inventory is provided below with respect to FIG. 5.

FIG. 5 is a schematic diagram 500 of a base class, Resource, for concrete Resource classes in FIG. 4. In some embodiments, the diagram 500 is applicable to each component of the diagram 400 (FIG. 4). In some embodiments, the diagram 500 provides an example of data returned to an rApp, e.g., rApps 120 (FIG. 1), by a TE&IV management module, e.g., TE&IV management module 140 (FIG. 1), in response to a topology and inventory query.

The diagram 500 includes a Resource 510. The Resource 510 contains both a ResourceProperty 520 and a ResourceRelationship 530. The ResourceRelationship 530 describes how the Resource 510 is related to other components of the O-RAN. That is, similar to the description above with respect to diagram 400 (FIG. 4), the ResourceRelationship 530 provides topology information for responding to a query from an rApp or other SMO internal and external functions. The ResourceProperty 520 provides information related to capabilities of the Resource 510 that would allow an rApp to determine what instructions the Resource 510 is capable of executing. These capabilities are inventory information. Utilizing both topology and inventory information, the rApp is able to determine how to route instructions through the O-RAN to collect data, execute functions, process data, or other activities for the rApp and other SMO internal and external functions to operate on the O-RAN.

Figure 6:
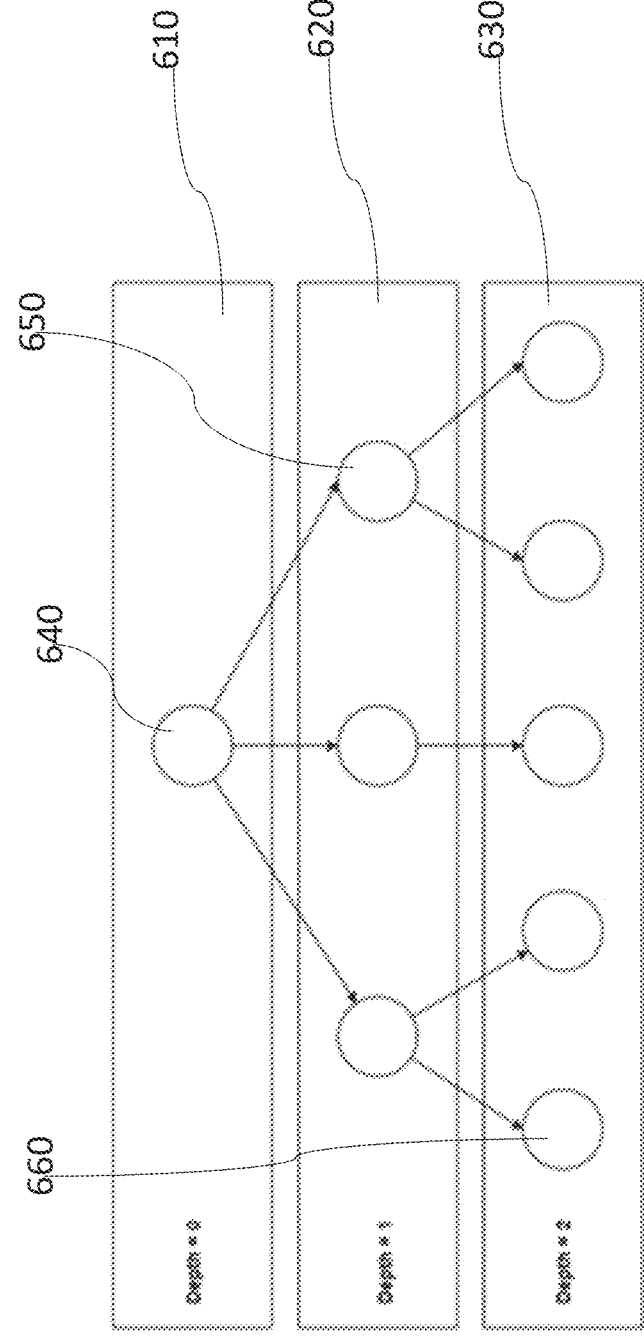
FIG. 6 is a diagram of topology data for components at different depths within an O-RAN in accordance with some embodiments.

FIG. 6 is a diagram 600 of topology data for components at different depths within an O-RAN in accordance with some embodiments. The diagram 600 includes a first node 640 located in a first level 610 of a network. The first node 640 is a top of a network topologically, similar to Network-Function 430 (FIG. 4). A query that returns information related to the first node 640 would indicate that the first node 640 is located at a depth of 0. That is, there are no hops within the network to collect information from the first node 640. The diagram 600 further includes a plurality of second nodes 650 located in a second level 620 of the network. The second nodes 650 are each one hop away from the first node 640. As a result, each of the second nodes 650 is at a depth of 1 within the network. The diagram 600 further includes a plurality of third nodes 660 located in a third level 630 of the network. Each of the third nodes 660 are two hops away from the first node 640. As a result, the third nodes 660 are at a depth of 2 in the network.

The diagram 600 provides information usable with respect to the query functionality described above with respect to the SMO 100 (FIG. 1). Utilizing depth information to determine a scope of a query helps to minimize the impact on the operation of the network while responding to queries and helps to reduce a risk of a third party obtaining too much or confidential information about the network. In some embodiments, an rApp is limited to a maximum depth for query information. By limiting the rApp to a maximum depth, a processing load on the network to respond to queries from the rApp is controlled. In some embodiments, the maximum depth permitted for an rApp is based on an identity of the owner of the rApp, a subscription fee paid by the rApp to the network, processing capacity of the network, or other suitable criteria. For example, a network operator utilizing an rApp would be permitted to query deeper into the network than a third party owner of an rApp. In a further example, a maximum depth for an rApp to query the network is reduced during times of high processing load on the network, in some embodiments. By controlling a depth within the network that an rApp is able to query, the network operator is able to regulate processing load on the network and maintain confidentiality related to the network.

FIG. 7 is a table 700 of sample service operations and HTTP methods supported by each TE&IV resource class modelled in FIG. 4 for retrieving and updating the topology and inventory data for an O-RAN component in accordance with some embodiments. The Table 700 includes a sample of operations, but one of ordinary skill in the art would understand that different operations are within the scope of this disclosure. In some embodiments, the service operations from Table 700 are utilized in the SMO 100 (FIG. 1), to provide topology and inventory information to rApps 120 (FIG. 1) or other internal and external SMO functions. In some embodiments, each operation in Table 700 is able to be utilized by any rApp or other SMO internal and external functions or TE&IV service consumers. In some embodiments, at least a portion of an operation in Table 700 is limited based on, for example, an identity of the owner of the rApp. For example, in some embodiments, only network operators are able to execute options from Table 700 that would create, delete, or update a component of the network. In some embodiments, rApps owned by third parties are limited to read based queries.

Utilizing queries, such as those in Table 700, allows rApps to gather information about the network in order for the rApps to route instructions for executing the functionality of the rApps. Limiting the availability of some queries in the Table 700 based on an identify of the owner of the rApps helps to regulate processing load on the network and reduces a risk of disclosing confidential information about the network.

Figure 8:
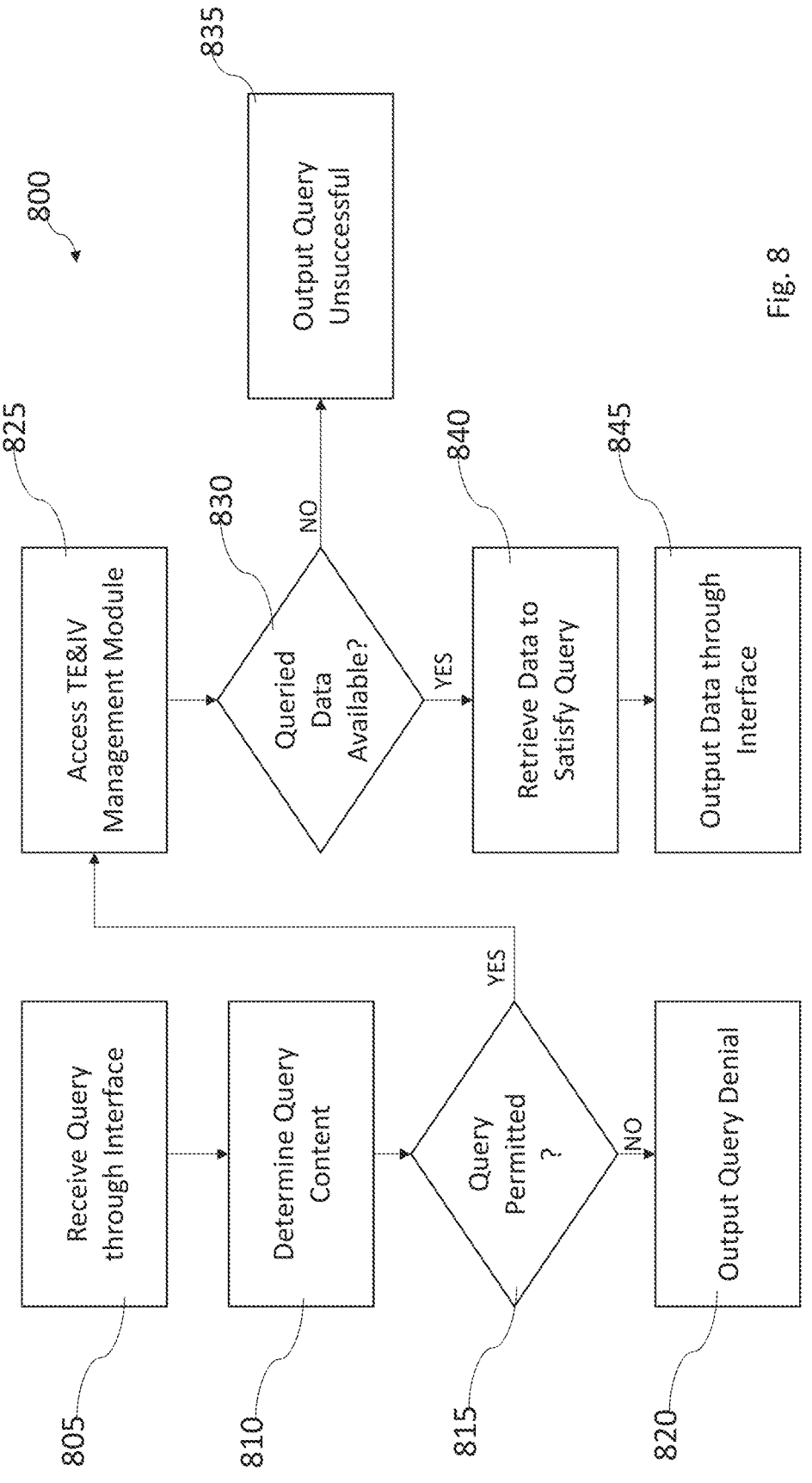
FIG. 8 is a flowchart of a method of collecting topology and inventory data from an O-RAN in accordance with some embodiments.

FIG. 8 is a flowchart of a method 800 of collecting topology and inventory data from an O-RAN in accordance with some embodiments. In some embodiments, the method 800 is executed by the SMO 100 (FIG. 1). In some embodiments, the method 800 is executed by a network component other than the SMO 100 (FIG. 1).

In operation 805, a query is received through an interface. In some embodiments, the query is received from an rApp, e.g., rApps 120 (FIG. 1), through an R1 interface, e.g., R1 interface 130 (FIG. 1). In some embodiments, the query is received from a network operator through the R1 interface. In some embodiments, the query is received by a network operator through an interface other than the R1 interface. In some embodiments, the query includes a query described above with respect to the SMO 100 (FIG. 1).

In operation 810, a content of the query is determined. In some embodiments, the content of the query includes information related to a type of action for the query, e.g., read, update, delete, create, or other suitable action. In some embodiments, the content of the query includes information related to a depth into the network from which the query seeks information. In some embodiments, the content of the query includes information related to a number of a resources or components about which the query seeks information. In some embodiments, the query further includes identifying information of a source of the query, e.g., an owner of an rApp, a network operator, or other suitable identifying information. In some embodiments, contents of the query are determined based on analysis of the syntax described above with respect to the SMO 100 (FIG. 1).

In operation 815, a determination is made regarding whether the query is permitted. The determination regarding whether the query is permitted is based on the content of the query. In some embodiments, the determination is made based on a combination of identifying information associated with the query and the content of the query. In some embodiments, the determination is made based on a combination of the content of the query and a current processing load of the network. In some embodiments, the determination is made based on a fee paid by the rApp for querying the network.

In some embodiments, a query is not permitted in response to a third party owned rApp seeking information greater than a threshold depth in the network. In some embodiments, the threshold depth is determined based on identifying information of the third party. In some embodiments, the threshold depth is determined based on a fee paid by the third party. In some embodiments, the threshold depth is determined based on a current processing load on the network. For example, a first depth is permitted during a low processing load on the network; and a second depth, less than the first depth, is permitted during a high processing load on the network. In some embodiments, a query to any depth is permitted for a network operator. By tailoring the query depth for different situations, the method 800 provides flexibility for providing rApps with sufficient data to implement the functionality of the rApp while also regulating processing load on the network and reducing a risk of confidential network information being collected by the rApp.

In some embodiments, a query is not permitted in response to the query from a third party including content for changing a topology of the network. A change in the topology of a network is implemented by content in the query including instructions to delete, update or post a resource or component in the network. In some embodiments, only queries that seek to change the topology of the network that are from network operators are permitted. By limiting an ability of third parties to change the topology of the network the method 800 helps to reduce a risk of inadvertent damage to the network.

In response to a determination that the query is permitted, the method 800 proceeds to operation 825. In response to a determination that the query is not permitted, the method 800 proceeds to operation 820.

In operation 820, a denial of the query is output. In some embodiments, the denial is transmitted to the rApp. In some embodiments, the denial is stored in log data of the rApp. In some embodiments, a reason that the query was not permitted is included in the denial. For example, in some embodiments, the reason includes information indicating that the query sought to access portions of the network unavailable to the rApp. In some embodiments, in response to a same rApp receiving multiple denials within a threshold time period, all queries from the rApp are not permitted. In some embodiments, action is required by a network operator to permit future queries from the rApp that received multiple denials within the threshold time period. In some embodiments, permission to submit permitted queries is granted to the rApp following an elapse of an exclusion time period.

In some embodiments, the denial is transmitted to a network operator as an alert of a potential unauthorized attempt to access the network. In some embodiments, the alert includes an audio alert or a visual alert. In some embodiments, the alert is transmitted to a terminal accessible by the network operator. In some embodiments, the alert includes instructions for causing the terminal to automatically display the alert.

In operation 825, the TE&IV management module is accessed in order to attempt to fulfill the query. In some embodiments, the TE&IV management module is the TE&IV management module 140 (FIG. 1). The TE&IV management module accesses a database that contains topology and inventory information for a network for responding to the query received in operation 805.

In operation 830, a determination is made regarding whether the information requested by the query is available. To make the determination, the TE&IV management module accesses the database in an attempt to fulfill the query. In response to a determination that the query was successfully fulfilled a determination is made that the information is available. In response to a determination that the query was not successfully fulfilled a determination is made that the information is unavailable.

In response to a determination that the queried data is available, the method 800 proceeds to operation 840. In response to a determination that the queried data is unavailable, the method 800 proceeds to operation 835.

In operation 835, a notification that the query was unsuccessful is output. In some embodiments, the notification is transmitted to the rApp. In some embodiments, the notification is stored in log data of the rApp.

In some embodiments, the notification is transmitted to a network operator as an alert of a potential unauthorized attempt to access the network. In some embodiments, the alert includes an audio alert or a visual alert. In some embodiments, the alert is transmitted to a terminal accessible by the network operator. In some embodiments, the alert includes instructions for causing the terminal to automatically display the alert. Transmitting the notification to the network operator allows the network operator to determine whether the requested information should have been available in order to efficiently and effectively diagnose a potential problem in the network.

In operation 840, the data is retrieved to satisfy the query. The data is retrieved by the TE&IV management module by accessing the database.

In operation 845, the retrieved data is output through the interface. In some embodiments, the retrieved data is transmitted to the rApp through the R1 interface. In some embodiments, successful receipt of the retrieved data is stored in log data of the rApp.

One of ordinary skill in the art would recognize that modifications to the method 800 are within the scope of this disclosure. In some embodiments, at least one of the operations of the method 800 is omitted. For example, in some embodiments, the operation 820 is omitted and any queries that are not permitted are discarded without outputting any notifications. In some embodiments, an order of operations of the method 800 is adjusted. For example, in some embodiments, the operations 825 and 830 are performed simultaneously. In some embodiments, at least one additional operation is included in the method 800. For example, in some embodiments, the method 800 includes an operation for an SMO, e.g., SMO 100 (FIG. 1), storing a log of received queries and results of processing the received queries.

Utilizing the method 800 helps to provide rApps with relevant information for executing the functionality of the rApps without placing undue burden on the network and reducing a risk of providing confidential information related to the network. In some embodiments utilizing the SMO 100 (FIG. 1), the method 800 provides an ability for rApps to obtain network information in a generic manner to reduce a burden on the developers of the rApps to customize the rApps for use across multiple networks.

Figure 9:
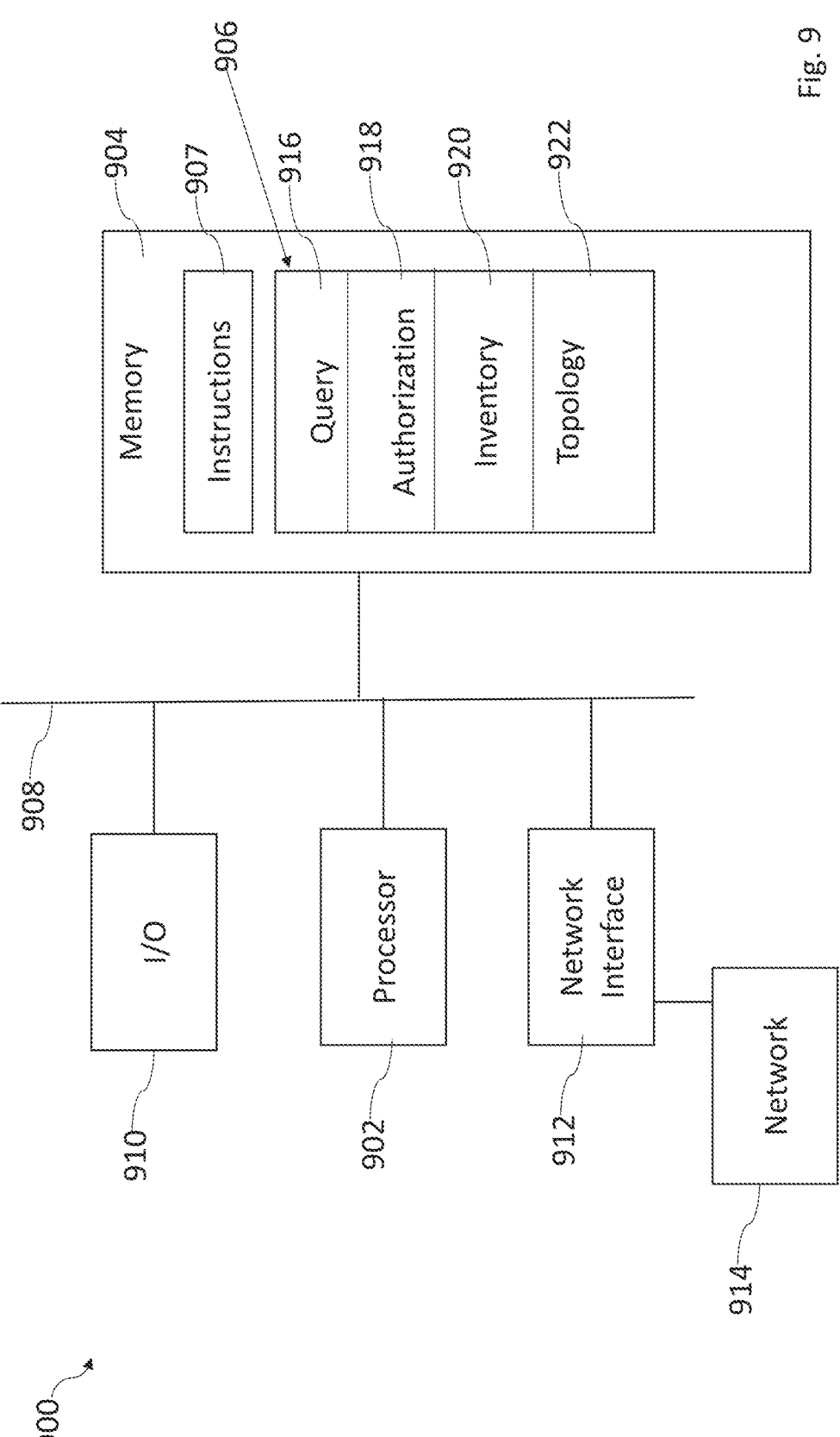
FIG. 9 is a schematic diagram of a system for collecting topology and inventory data from an O-RAN in accordance with some embodiments.

FIG. 9 is a schematic view of a system 900 for collecting topology and inventory information in accordance with some embodiments. System 900 includes a hardware processor 902 and a non-transitory, computer readable storage medium 904 encoded with, i.e., storing, the computer program code 906, i.e., a set of executable instructions. Computer readable storage medium 904 is also encoded with instructions 907 for interfacing with external devices. The processor 902 is electrically coupled to the computer readable storage medium 904 via a bus 908. The processor 902 is also electrically coupled to an input/output (I/O) interface 910 by bus 908. A network interface 912 is also electrically connected to the processor 902 via bus 908. Network interface 912 is connected to a network 914, so that processor 902 and computer readable storage medium 904 are capable of connecting to external elements via network 914. The processor 902 is configured to execute the computer program code 906 encoded in the computer readable storage medium 904 in order to cause system 900 to be usable for performing a portion or all of the operations as described in SMO 100 (FIG. 1), O-RAN 300 (FIG. 3) or method 800 (FIG. 8).

In some embodiments, the processor 902 is a central processing unit (CPU), a multi-processor, a distributed processing system, an application specific integrated circuit (ASIC), and/or a suitable processing unit.

In some embodiments, the computer readable storage medium 904 is an electronic, magnetic, optical, electromagnetic, infrared, and/or a semiconductor system (or apparatus or device). For example, the computer readable storage medium 904 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 904 includes a compact disk-read only memory (CD-ROM), a compact disk-read/write (CD-R/W), and/or a digital video disc (DVD).

In some embodiments, the storage medium 904 stores the computer program code 906 configured to cause system 900 to perform a portion or all of the operations as described in SMO 100 (FIG. 1), O-RAN 300 (FIG. 3) or method 800 (FIG. 8). In some embodiments, the storage medium 904 also stores information used for performing a portion or all of the operations as described in SMO 100 (FIG. 1), O-RAN 300 (FIG. 3) or method 800 (FIG. 8) as well as information generated during performing a portion or all of the operations as described in SMO 100 (FIG. 1), O-RAN 300 (FIG. 3) or method 800 (FIG. 8), such as a query parameter 916, an authorization parameter 918, an inventory parameter 920, a topology parameter 922, and/or a set of executable instructions to perform the operation of a portion or all of the operations as described in SMO 100 (FIG. 1), O-RAN 300 (FIG. 3) or method 800 (FIG. 8).

In some embodiments, the storage medium 904 stores instructions 907 for interfacing with external devices. The instructions 907 enable processor 902 to generate instructions readable by the external devices to effectively implement a portion or all of the operations as described in SMO 100 (FIG. 1), O-RAN 300 (FIG. 3) or method 800 (FIG. 8).

System 900 includes I/O interface 910. I/O interface 910 is coupled to external circuitry. In some embodiments, I/O interface 910 includes a keyboard, keypad, mouse, trackball, trackpad, and/or cursor direction keys for communicating information and commands to processor 902.

System 900 also includes network interface 912 coupled to the processor 902. Network interface 912 allows system 900 to communicate with network 914, to which one or more other computer systems are connected. Network interface 912 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in SMO 100 (FIG. 1), O-RAN 300 (FIG. 3) or method 800 (FIG. 8) is implemented in two or more systems 900, and information such as query, authorization, inventory, or topology are exchanged between different systems 900 via network 914.

Supplemental Note 1

A method of collecting, creating or updating topology and inventory data for a network includes receiving a request through an interface of a service management and orchestrator (SMO), wherein the request contains instructions for topology and inventory information to be collected, created or updated. The method further includes transferring the request to a topology and inventory (TE&IV) management module. The method further includes collecting, creating or updating topology and inventory data for at least a first component of the network based on the request. The topology and inventory data includes a relationship information between the first component and at least a second component of the network, and capability information for the first component.

19
Supplemental Note 2

The method of Supplemental Note 1, wherein the interface is an R1 service application programming interface (API), or a SMO TE&IV service API.

Supplemental Note 3

The method of Supplemental Note 1 or 2, further comprising collecting topology and inventory data based on an information model of the network for a third component of the network, wherein the first component is part of a radio network within the network, and the third component is part of a cloud computing network within the network.

Supplemental Note 4

The method of any of Supplemental Notes 1-3, further comprising limiting a depth of collecting of the topology and inventory data within the network topology based on at least one of an identity of a source in the query or a searching depth parameter.

Supplemental Note 5

The method of any of Supplemental Notes 1-4, wherein the request includes identifying information for the first component.

Supplemental Note 6

The method of any of Supplemental Notes 1-5, wherein the request specifies a relationship type to be searched in the layers below the first component within the network topology.

Supplemental Note 7

The method of any of Supplemental Notes 1-6, wherein the request includes a depth parameter limiting a number of layers in the network topology below the first component to be included for responding to the query.

Supplemental Note 8

A non-transitory computer readable medium configured to store instructions thereon for causing a system to execute a method including receiving a request through an interface of a service management and orchestrator (SMO), wherein the request contains instructions for topology and inventory information to be collected, created or updated. The method further includes transferring the request to a topology and inventory (TE&IV) management module. The method further includes collecting, creating or updating topology and inventory data for at least a first component of the network based on the request. The topology and inventory data includes a relationship information between the first component and at least a second component of the network, and capability information for the first component.

Supplemental Note 9

The non-transitory computer readable medium of Supplemental Note 8, wherein the interface is an R1 service application programming interface (API), or a SMO TE&IV service API.

20
Supplemental Note 10

The non-transitory computer readable medium of Supplemental Note 8 or 9, wherein the instructions are further configured to cause the system to collect topology and inventory data based on an information model of the network for a third component of the network, wherein the first component is part of a radio network within the network, and the third component is part of a cloud computing network within the network.

Supplemental Note 11

The non-transitory computer readable medium of any of Supplemental Notes 8-10, wherein the instructions are further configured to cause the system to limit a depth of collecting of the topology and inventory data within the network topology based on at least one of an identity of a source in the query or a searching depth parameter.

Supplemental Note 12

The non-transitory computer readable medium of any of Supplemental Notes 8-11, wherein the request includes identifying information for the first component.

Supplemental Note 13

The non-transitory computer readable medium of any of Supplemental Notes 8-12, wherein the request specifies a relationship type to be searched in the layers below the first component within the network topology.

Supplemental Note 14

The non-transitory computer readable medium of any of Supplemental Notes 8-13, wherein the request includes a depth parameter limiting a number of layers in the network topology below the first component to be included for responding to the query.

Supplemental Note 15

A system for collecting, creating, or updating topology and inventory data for a network includes a service management and orchestrator (SMO). The SMO is configured to receive a request through an interface, wherein the request contains a topology and inventory information to be collected, created or updated. The SMO is further configured to transfer the request to a topology and inventory (TE&IV) management module. The SMO is further configured to collect, create or update topology and inventory data for at least a first component of the network based on the query. The topology and inventory data includes a relationship information between the first component and at least a second component of the network, and capability information for the first components. The SMO is further configured to output the collected topology and inventory data through the interface.

Supplemental Note 16

The system of Supplemental Note 15, wherein the interface is an R1 service application programming interface (API), or a SMO TE&IV service API.

Supplemental Note 17

The system of Supplemental Note 15 or 16, wherein the SMO is further configured to collect, create or update topology and inventory data for a third component of the network, wherein the first component is part of a radio network within the network, and the third component is part of a cloud computing network within the network.

Supplemental Note 18

The system of any of Supplemental Notes 15-17, wherein the SMO is further configured to limit a depth of collecting of the topology and inventory data within the network topology based on at least one of an identity of a source of the query or a depth parameter.

Supplemental Note 19

The system of any of Supplemental Notes 15-18, wherein the request includes identifying information for the first component.

Supplemental Note 20

The system of any of Supplemental Notes 15-19, wherein the request specifies a relationship type to be searched in layers below the first component.

Supplemental Note 21

A method of modelling an arrangement of O-RAN components in an O-RAN network, the relationship information between each O-RAN component in the network, and the capability information for each O-RAN component includes a base TE&IV resource class containing a first property storing the inventory data of a O-RAN component and a second property storing the relationship information of the O-RAN component with at least another O-RAN component. The method further includes at least one concrete class inheriting the two properties from the base class, wherein a realized object instance of the concrete class stores the actual inventory and topology data of the modelled O-RAN component. The method further includes the inventory data corresponding to capabilities of the modelled O-RAN component being stored in the first property and the topology data corresponding to the relationship of the modelled O-RAN component with at least another modelled O-RAN component being stored in the second property.

Supplemental Note 22

The method of Supplemental Note 21, wherein the modelled O-RAN component includes at least one of GNB-CUCPFunction, GNBDUFunction, or OCloudNode.

Supplemental Note 23

A system for modelling an arrangement of O-RAN components in an O-RAN network, the relationship information between each O-RAN component in the network, and capability information for each O-RAN component includes a base TE&IV resource class containing a first property for storing the inventory data of a O-RAN component and a second property for storing the relationship information of the O-RAN component with at least another O-RAN component. The system further includes at least one concrete class for inheriting two properties from a base class, wherein the realized object instance of the concrete class is configured to store the actual inventory and topology data of the modelled O-RAN component. The system further includes inventory data corresponding to capabilities of the modelled O-RAN component stored in the first property and the topology data corresponding to the relationship of the modelled O-RAN component with at least another modelled O-RAN component stored in the second property.

Supplemental Note 24

The system of Supplemental Note 23, wherein the modelled O-RAN component includes at least one of GNB-CUCPFunction, GNBDUFunction, or OCloudNode.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of collecting, creating or updating topology and inventory data for a network, the method comprising:
    receiving a request through an interface of a service management and orchestrator (SMO), wherein the request contains instructions for topology and inventory information to be collected, created or updated;
    transferring the request to a topology and inventory (TE&IV) management module;
    collecting, creating or updating topology and inventory data for at least a first component of the network based on the request, wherein the topology and inventory data includes:
        a relationship information between the first component and at least a second component of the network, and capability information for the first component; and
    outputting the collected topology and inventory data through the interface.

2. The method of claim 1, wherein the interface is an R1 service application programming interface (API), or a SMO TE&IV service API.

3. The method of claim 1, further comprising collecting topology and inventory data based on an information model of the network for a third component of the network, wherein the first component is part of a radio network within the network, and the third component is part of a cloud computing network within the network.

4. The method of claim 1, further comprising limiting a depth of collecting of the topology and inventory data within the network topology based on at least one of an identity of a source in the query or a searching depth parameter.

5. The method of claim 1, wherein the request includes identifying information for the first component.

6. The method of claim 5, wherein the request specifies a relationship type to be searched in the layers below the first component within the network topology.

7. The method of claim 1, wherein
    collecting, creating or updating the topology and inventory data comprises using a TE&IV model and an application program interface (API), and outputting the collected topology and inventory data comprises transmitting the collected topology and inventory data externally to the TE&IV management module.

8. A non-transitory computer readable medium configured to store instructions thereon for causing a system to execute a method comprising:

receiving a request through an interface of a service management and orchestrator (SMO), wherein the request contains instructions for topology and inventory information to be collected, created or updated;

transferring the request to a topology and inventory (TE&IV) management module;

collecting, creating or updating topology and inventory data for at least a first component of the network based on the request, wherein the topology and inventory data includes:

a relationship information between the first component and at least a second component of the network, and capability information for the first component.

9. The non-transitory computer readable medium of claim 8, wherein the interface is an R1 service application programming interface (API), or a SMO TE&IV service API.

10. The non-transitory computer readable medium of claim 8, wherein the instructions are further configured to cause the system to collect topology and inventory data based on an information model of the network for a third component of the network, wherein the first component is part of a radio network within the network, and the third component is part of a cloud computing network within the network.

11. The non-transitory computer readable medium of claim 8, wherein the instructions are further configured to cause the system to limit a depth of collecting of the topology and inventory data within the network topology based on at least one of an identity of a source in the query or a searching depth parameter.

12. The non-transitory computer readable medium of claim 8, wherein the request includes identifying information for the first component.

13. The non-transitory computer readable medium of claim 12, wherein the request specifies a relationship type to be searched in the layers below the first component within the network topology.

14. The non-transitory computer readable medium of claim 8, wherein collecting, creating or updating the topology and inventory data comprises using a TE&IV model and an application program interface (API), and outputting the collected topology and inventory data, wherein the outputting comprises transmitting the collected topology and inventory data externally to the TE&IV management module.

15. A system for collecting, creating, or updating topology and inventory data for a network, the system comprising:

a service management and orchestrator (SMO) configured to:

receive a request through an interface, wherein the request contains a topology and inventory information to be collected, created or updated;

transfer the request to a topology and inventory (TE&IV) management module;

collect, create or update topology and inventory data for at least a first component of the network based on the query, wherein the topology and inventory data includes:

a relationship information between the first component and at least a second component of the network, and capability information for the first components; and output the collected topology and inventory data through the interface.

16. The system of claim 15, wherein the interface is an R1 service application programming interface (API), or a SMO TE&IV service API.

17. The system of claim 15, wherein the SMO is further configured to collect, create or update topology and inventory data for a third component of the network, wherein the first component is part of a radio network within the network, and the third component is part of a cloud computing network within the network.

18. The system of claim 15, wherein the SMO is further configured to limit a depth of collecting of the topology and inventory data within the network topology based on at least one of an identity of a source of the query or a depth parameter.

19. The system of claim 15, wherein the request includes identifying information for the first component.

20. The system of claim 19, wherein the request specifies a relationship type to be searched in layers below the first component.

* * * * *